United States Patent
Katou (10) Patent No.: US 10,802,562 B2
(45) Date of Patent: Oct. 13, 2020

(54) MEMORY SYSTEM AND CONTROL METHOD OF MEMORY SYSTEM

(71) Applicant: Toshiba Memory Corporation, Tokyo (JP)

(72) Inventor: Takehiko Katou, Kawasaki Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 530 days.

(21) Appl. No.: 15/694,725

(22) Filed: Sep. 1, 2017

(65) Prior Publication Data

US 2018/0275735 A1    Sep. 27, 2018

(30) Foreign Application Priority Data

Mar. 23, 2017 (JP) ................................. 2017-058064

(51) Int. Cl.
| | |
|---|---|
| *H02H 3/00* | (2006.01) |
| *G06F 1/28* | (2006.01) |
| *G06F 1/3225* | (2019.01) |
| *G06F 1/26* | (2006.01) |
| *G06F 1/3287* | (2019.01) |
| *G06F 1/30* | (2006.01) |
| *G06F 3/06* | (2006.01) |

(52) U.S. Cl.
CPC ............. *G06F 1/28* (2013.01); *G06F 1/266* (2013.01); *G06F 1/30* (2013.01); *G06F 1/3225* (2013.01); *G06F 1/3287* (2013.01); *G06F 3/0625* (2013.01); *G06F 3/0634* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 4,761,765 A | * | 8/1988 | Hashimoto | ............ G11C 7/062 |
| | | | | 365/185.21 |
| 8,635,471 B2 | | 1/2014 | Oguro et al. | |
| 9,251,839 B1 | | 2/2016 | Agness et al. | |
| 9,263,099 B2 | * | 2/2016 | Kwon | ..................... G11C 5/148 |

FOREIGN PATENT DOCUMENTS

| | | |
|---|---|---|
| JP | 2001045657 A | 2/2001 |
| JP | 2007-195330 A | 8/2007 |
| JP | 2007195330 A | 8/2007 |
| JP | 5758052 B2 | 8/2015 |

* cited by examiner

Primary Examiner — Stephen W Jackson
(74) Attorney, Agent, or Firm — Kim & Stewart LLP (57) ABSTRACT

A memory system includes a host interface, a nonvolatile memory, a power supply circuit, a protection circuit, and a first voltage monitor circuit. The power supply circuit is between the host interface and the nonvolatile memory, and supplies primary power to the nonvolatile memory. The protection circuit is between the host interface and the power supply circuit, and configured to clamp a power supply signal supplied from the host interface to the power supply circuit to a first voltage. The first voltage monitor circuit is between the host interface and the protection circuit, and configured to monitor a voltage level of the power supply signal supplied from the host interface and cause the voltage level of the power supply signal supplied to the power supply circuit to be decreased from the first voltage to a second voltage when the monitored voltage level is below a first threshold voltage.

20 Claims, 4 Drawing Sheets

MEMORY SYSTEM AND CONTROL METHOD OF MEMORY SYSTEM

CROSS-REFERENCE TO RELATED APPLICATION

This application is based upon and claims the benefit of priority from Japanese Patent Application No. 2017-058064, filed Mar. 23, 2017, the entire contents of which are incorporated herein by reference.

FIELD

Embodiments described herein relate generally to a memory system and a control method of the memory system.

BACKGROUND

Generally, in a memory system, a power supply voltage received from outside is supplied to a nonvolatile memory or the like via a power supply circuit. When the power supply voltage is supplied to the power supply circuit, it is desirable to appropriately protect the power supply circuit.

DETAILED DESCRIPTION

Embodiments provide a memory system and a control method of the memory system that can appropriately protect a power supply circuit.

In general, according to one embodiment, a memory system includes a host interface, a nonvolatile memory, a power supply circuit, a protection circuit, and a first voltage monitor circuit. The power supply circuit is between the host interface and the nonvolatile memory, and supplies primary power to the nonvolatile memory. The protection circuit is between the host interface and the power supply circuit, and configured to clamp a power supply signal supplied from the host interface to the power supply circuit to a first voltage. The first voltage monitor circuit is between the host interface and the protection circuit, and configured to monitor a voltage level of the power supply signal supplied from the host interface and cause the voltage level of the power supply signal supplied to the power supply circuit to be decreased from the first voltage to a second voltage when the monitored voltage level is below a first threshold voltage.

Hereinafter, the memory system according to the exemplary embodiment will be described in detail with reference to the drawings. The disclosure is not limited by the exemplary embodiment.

Exemplary Embodiment

Figure 1:
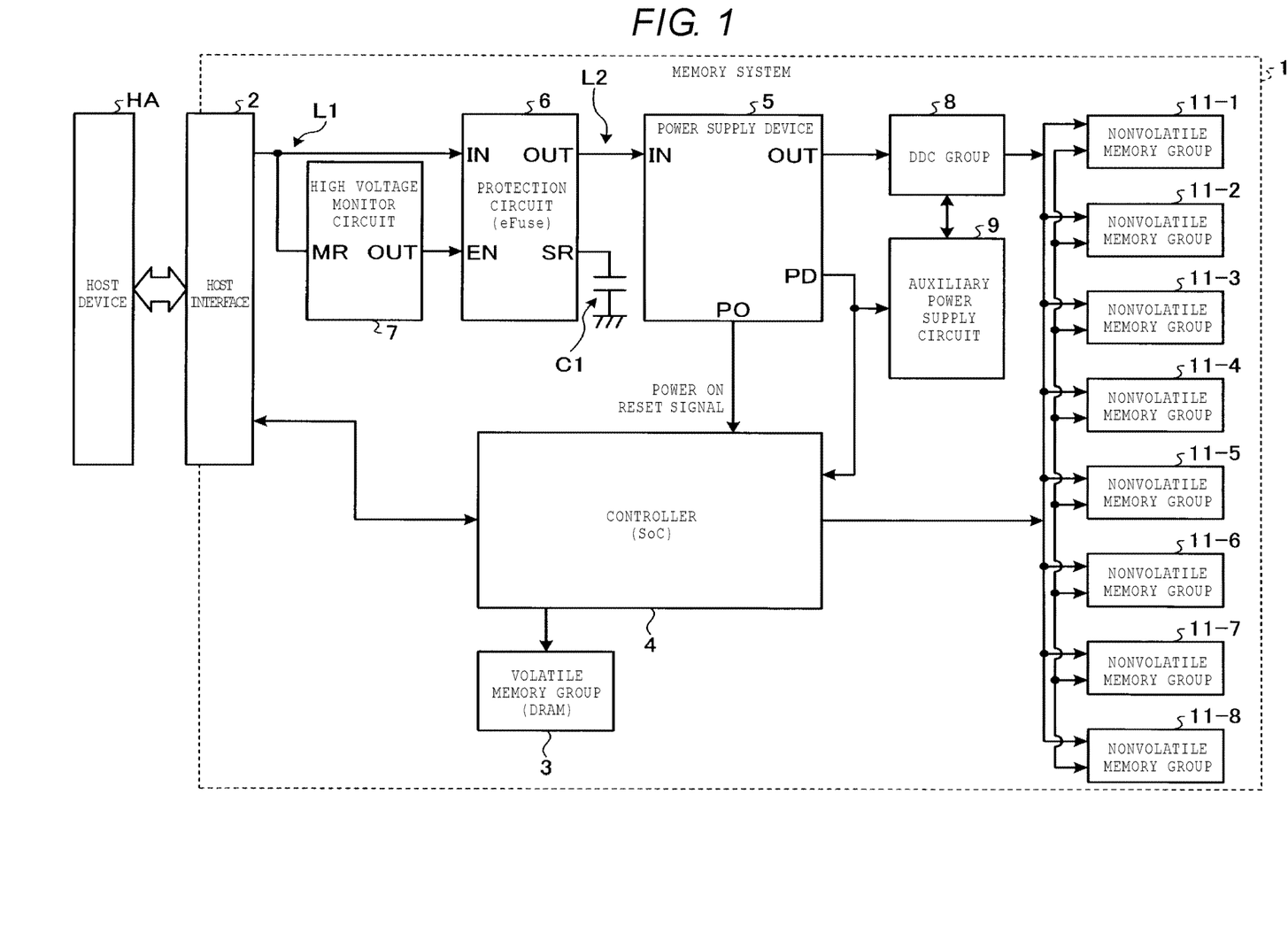
FIG. 1 is a block diagram illustrating a configuration of a memory system according to an embodiment.

FIG. 1 is a block diagram illustrating a configuration of a memory system 1.

The memory system 1 is, for example, a solid state drive (SSD), which can be communicably connected to a host device HA, and can function as an external storage medium for the host device HA. The host device HA may be, for example, an information processing device such as a personal computer, a server, a storage box, a mobile phone, an imaging device; may be a mobile terminal such as a tablet computer or a smart phone; may be a game device; or may be an in-vehicle terminal such as a car navigation system.

As illustrated in FIG. 1, the memory system 1 includes a host interface 2, a volatile memory group 3, a controller 4, a power supply device 5, a DDC (DC-DC converter) group 8, a protection circuit 6, and a plurality of nonvolatile memory groups 11 (11-1 to 11-8). In one embodiment, these elements are mounted on a circuit board.

The host interface 2 includes a connector. The connector can be arranged at, for example, an end portion of the circuit board. The connector includes power pins and data pins. The host interface 2 supplies data received from the host device HA via the data pins to the controller 4, or transmits data received from the controller 4 to the host device HA via the data pins. In addition, the host interface 2 supplies a power received from the host device HA via the power pins to the power supply device 5 via the protection circuit 6.

Figure 2:
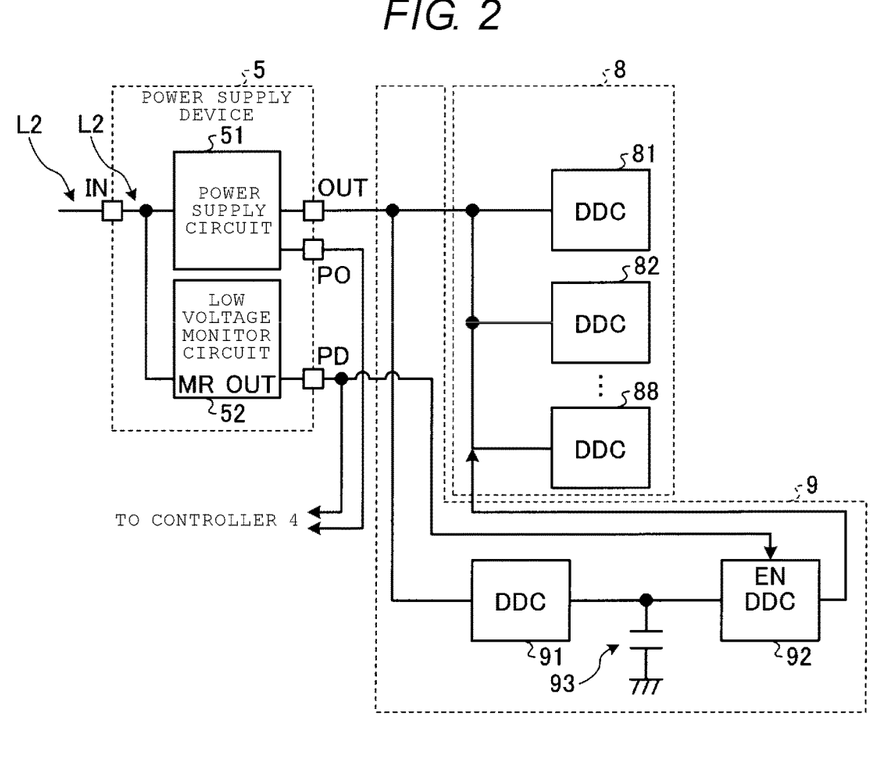
FIG. 2 is a diagram illustrating configurations of a power supply device, DDC groups, and an auxiliary power supply circuit in the embodiment.

The power supply device 5 is arranged between the host interface 2 and the nonvolatile memory group 11. The power supply device 5 can be mounted on the circuit board in the vicinity of the connector as a plurality of components (not illustrated). As illustrated in FIG. 2, the power supply device 5 includes a power supply circuit 51. The power supply device 5 includes an input terminal IN, an output terminal OUT, and a control output terminal PO. The input terminal IN is connected the protection circuit 6. The output terminal OUT is connected to the DDC group 8. The control output terminal PO is connected to the controller 4. The power supply circuit 51 generates a power supply voltage for internal use of the memory system 1 from a power supply voltage received in the input terminal IN from the host interface 2 via the protection circuit 6. The power supply circuit 51 supplies the generated power supply voltage to the DDC group 8 via the output terminal OUT.

Returning to FIG. 1, the power supply device 5 detects a rising of the external power supply voltage, generates a power-on reset signal, and supplies the generated power-on reset signal to the controller 4 via the control output terminal PO.

The DDC group 8 includes a plurality of DDCs 81 to 88 as illustrated in FIG. 2. Each of the DDCs 81 to 88 is a DC-DC converter, and receives a power supply voltage Vdd from the power supply circuit 51, converts the power supply voltage Vdd to a different voltage level, and outputs the converted power supply voltage Vps. The plurality of DDCs 81 to 88 corresponds to a plurality of nonvolatile memory groups 11, controllers 4, and volatile memory group 3. Each of the DDCs 81 to 88 outputs the converted power supply voltage Vps to the corresponding nonvolatile memory group 11, the controller 4, and the volatile memory group 3.

The controller 4 can be mounted, for example, on the circuit board in the vicinity of the connector as a system on chip (SoC) package. The controller 4 generally controls each unit of the memory system 1.

The volatile memory group 3 can be mounted, for example, on the circuit board in the vicinity of the connector as a plurality of volatile memory packages. Each volatile memory group 3 is, for example, SDRAM, DRAM, or SRAM. The volatile memory group 3 functions as a buffer when a signal (for example, a command, data or the like) is communicated between the host device HA or the nonvolatile memory group 11 and the controller 4, or functions as a work area for the controller 4.

The plurality of nonvolatile memory groups 11 are mounted on the circuit board. The nonvolatile memory group 11 can be mounted, for example, on both sides of the circuit board as a plurality of nonvolatile memory packages.

In each nonvolatile memory package, a plurality of chips of the nonvolatile memory (for example, a NAND flash memory) device are stacked to be accommodated. The nonvolatile memory device stores data in a nonvolatile manner. The nonvolatile memory device includes a memory cell array in which a plurality of memory cells are arrayed in a planar or a three-dimensional matrix configuration. Each memory cell may be capable of multi-level storage using, for example, an upper page and a lower page. In the nonvolatile memory device, data is erased on a block basis, and data writing and data reading are performed for each page. The block is configured with a plurality of pages.

The protection circuit 6 is arranged between the host interface 2 and the power supply device 5. The protection circuit 6 can be mounted as, for example, a protection circuit package. Returning to FIG. 1, the protection circuit 6 includes an input terminal IN, an output terminal OUT, an enable terminal EN, and a slew rate control terminal SR. In the protection circuit 6, the power pins of the host interface 2 are connected to the input terminal IN and the power supply device 5 is connected to the output terminal OUT. The protection circuit 6 is in an ON state when an electric potential at the enable terminal EN is at an active level (for example, L level). When the protection circuit 6 is in the ON state, the input terminal IN and the output terminal OUT are electrically connected. The protection circuit 6 becomes in OFF state when the electric potential at the enable terminal EN is at a non-active level (for example, H level). When the protection circuit 6 is in the OFF state, the connection between the input terminal IN and the output terminal OUT is electrically disconnected. In the protection circuit 6, a capacitance element C1 is electrically connected externally to the slew rate control terminal SR. The protection circuit 6 can adjust a rise time of the protection circuit 6 in the ON state according to the capacitance value of the capacitance element C1 externally connected to the slew rate control terminal SR.

The protection circuit 6 is an eFuse that performs a circuit operation for protecting the system from an overvoltage, and a predetermined clamp voltage (for example, 15V) is set in advance. The protection circuit 6 has a function of clamping the input voltage to the clamp voltage. Since the clamp voltage is set in the protection circuit 6 as a fixed value, the clamp voltage cannot be changed after shipment.

In the memory system 1, the power supply voltage is input to the protection circuit 6 from outside via the power pins of the host interface 2. When the input power supply voltage exceeds the clamp voltage, the protection circuit 6 clamps the power supply voltage to the clamp voltage, and outputs the clamped power supply voltage to the power supply device 5. In this way, it is possible to prevent the power supply voltage exceeding the clamp voltage from being supplied to the power supply circuit 51. That is, if an allowable upper limit voltage of the power supply circuit 51 is higher than the clamp voltage, the power supply circuit 51 can be protected from destruction due to the overvoltage by the clamping function of the protection circuit 6.

However, as the miniaturization of the elements included in the power supply circuit 51 progresses, the allowable upper limit voltage of the power supply circuit 51 can become lower than the clamp voltage (for example, to 14V). In this case, when the power supply voltage clamped to the clamp voltage (for example, 15V) is supplied to the power supply circuit 51, there is a possibility that the power supply circuit 51 may be destroyed by the overvoltage.

Therefore, in the exemplary embodiment, in the memory system 1, by configuring the protection circuit 6 so as to monitor the level of the power supply voltage input to the protection circuit 6 such that the protection circuit 6 goes into the OFF state in a case where the power supply voltage has a value lower than the clamp voltage and close to the allowable upper limit voltage of the power supply circuit 51, the power supply circuit 51 can be prevented from being destroyed due to the overvoltage.

Specifically, the memory system 1 further includes a high voltage monitor circuit 7. The high voltage monitor circuit 7 is arranged between the host interface 2 and the protection circuit 6. The high voltage monitor circuit 7 is electrically inserted between a line L1 and the protection circuit 6. The line L1 electrically connects the power pins of the host interface 2 and the input terminal IN of the protection circuit 6. The high voltage monitor circuit 7 can be mounted as a high voltage monitor circuit package. The high voltage monitor circuit 7 includes a monitor terminal MR and the output terminal OUT. In the high voltage monitor circuit 7, the monitor terminal MR is connected to the line L1, and the output terminal OUT is connected to the enable terminal EN of the protection circuit 6. The high voltage monitor circuit 7 monitors whether or not the electric potential at the line L1 exceeds a threshold voltage Vov.

Figure 3:
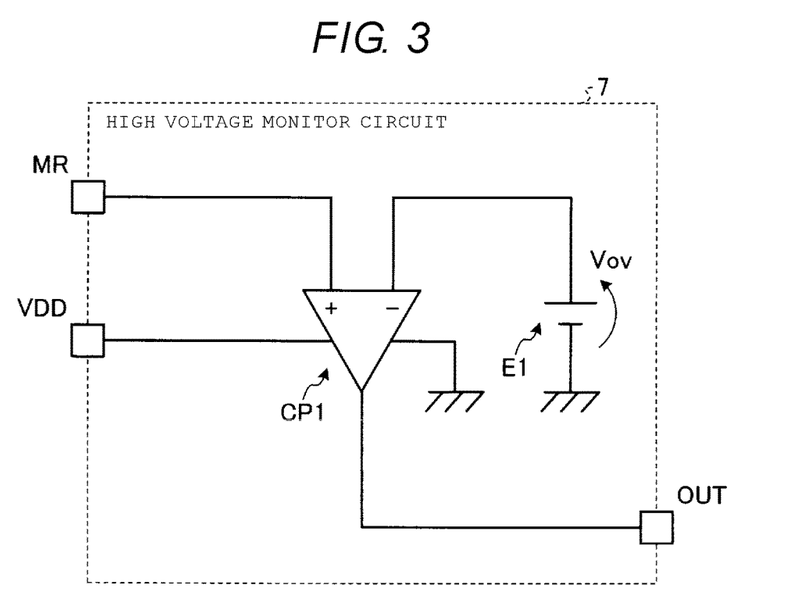
FIG. 3 is a circuit diagram illustrating a configuration of a high voltage monitor circuit in the embodiment.

Specifically, the high voltage monitor circuit 7 is configured as illustrated in FIG. 3. FIG. 3 is a circuit diagram illustrating a configuration of a high voltage monitor circuit 7. The configuration illustrated in FIG. 3 is an example, and other configurations may be used as long as the circuit monitors whether or not the electric potential at the line L1 exceeds a threshold voltage Vov.

The high voltage monitor circuit 7 includes a power terminal VDD, the monitor terminal MR, the output terminal OUT, a comparator CP1, and a voltage source E1. In the comparator CP1, a power supply node is electrically connected to the power terminal VDD, a ground node is electrically connected to a ground potential, a non-inverting input terminal is electrically connected to the monitor terminal MR, an inverting input terminal is electrically connected to the voltage source E1, and an output node is electrically connected to the output terminal OUT. The voltage source E1 generates the threshold voltage Vov as a reference voltage and supplies the reference voltage to the comparator CP1. The reference voltage is a voltage which is equal the threshold voltage to be monitored by the high voltage monitor circuit 7, and has a level between a voltage level of the power supply voltage Vdd and the ground level.

If the electric potential at the monitor terminal MR is lower than the threshold voltage Vov, the comparator CP1 supplies a signal of L level to the output terminal OUT as a comparison result. When the electric potential at the monitor terminal MR becomes higher than the threshold voltage Vov, the comparator CP1 supplies a signal of H level to the output terminal OUT as a comparison result.

Figure 4:
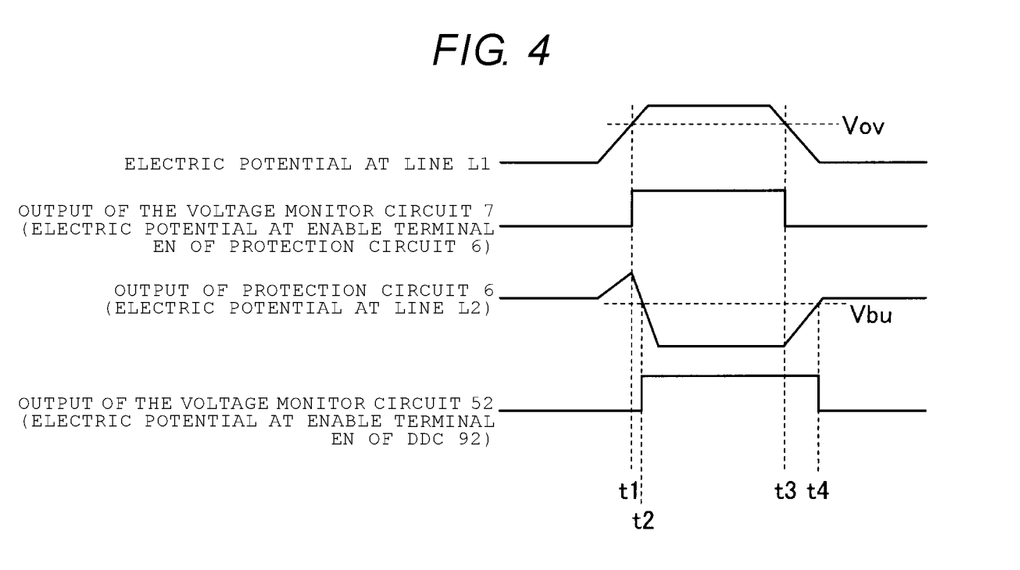
FIG. 4 is a waveform diagram illustrating an operation of the memory system according to the embodiment.

For example, as illustrated in FIG. 4, the high voltage monitor circuit 7 monitors whether or not the electric potential at the line L1 exceeds the threshold voltage Vov. The threshold voltage Vov is a value lower than the allowable upper limit voltage (for example, 14V), higher than the normal electric potential level (for example, substantially close to 12V) at the line L1, and further, close to the allowable upper limit voltage of the power supply circuit 51. The threshold voltage Vov is, for example, 13.5V. The allowable upper limit voltage of the high voltage monitor circuit 7 is higher than the allowable upper limit voltage of the power supply circuit 51.

In a period before timing t1, the high voltage monitor circuit 7 outputs the L level to the output terminal OUT according to the fact that electric potential at the line L1 is lower than the threshold voltage Vov. The L level can also be regarded as a monitoring result indicating that the electric potential at the line L1 is lower than the threshold voltage Vov. That is, the high voltage monitor circuit 7 makes the enable terminal EN of the protection circuit 6 be at the L level. In this way, during the period in which the electric potential at the line L1 is lower than the threshold voltage Vov, the protection circuit 6 is maintained to be in ON state, and thus, the power supply voltage is supplied to the power supply device 5 from the power pins of the host interface 2 via the line L1 and the protection circuit 6.

At the timing t1, the high voltage monitor circuit 7 outputs the H level from the output terminal OUT according to the fact that the electric potential at the line L1 becomes higher than the threshold voltage Vov. The H level can also be regarded as a monitoring result indicating that the electric potential at the line L1 is higher than the threshold voltage Vov. That is, the high voltage monitor circuit 7 makes the enable terminal EN of the protection circuit 6 be at the H level. In this way, the protection circuit 6 is maintained to be in OFF state after the timing t1 according to the fact that the electric potential at the line L1 becomes higher than the threshold voltage Vov. That is, even if the electric potential at the line L1 is lower than the clamp voltage (for example, 15V), in a case where the electric potential at the line L1 is close to the allowable upper limit voltage (for example, 14V) of the power supply circuit 51 and exceeds the threshold voltage Vov (for example, 13.5V), since the protection circuit 6 can be in an OFF state, it is possible to prevent the power supply circuit 51 from being destroyed due to the overvoltage.

At this time, since the power supply to the power supply device 5 from the power pins of the host interface 2 is disconnected by the protection circuit 6, the memory system 1 is configured in such a manner that the power is switched to the auxiliary power supply and the power loss data protection (PLP) processing is performed. In the PLP processing, data can be prevented from loss by transferring the data to the nonvolatile memory group 11 from the volatile memory group 3 during the period of power supply from the auxiliary power supply.

As illustrated in FIG. 1 and FIG. 2, specifically, the memory system 1 further includes the auxiliary power supply circuit 9. The auxiliary power supply circuit 9 includes a DDC 91, a DDC 92, and a back-up battery 93. The back-up battery is, for example, a capacitor, a super capacitor, an electrolytic capacitor, a secondary battery, or the like. In FIG. 2, illustrates a case where the back-up battery 93 is a capacitor. The DDC 91 is a DC-DC converter that receives the power supply voltage Vdd from the power supply circuit 51, adjust the level of the power supply voltage Vdd to a level suitable for charging the back-up battery 93 (for example, step down or boost), and supplies the result to the back-up battery 93. The DDC92 is a DC-DC converter that includes an enable terminal EN. The DDC 92 is in an OFF state when a control signal of the non-active level (for example, L level) is received by the enable terminal EN. In this way, the auxiliary power supply circuit 9 is in an OFF state. The DDC 92 is in ON state when the control signal of active level (for example, H level) is received by the enable terminal EN, and adjusts the voltage taken out from the back-up battery 93 to a level suitable for the operation of the DDC group 8 (for example, boost or step down), and supplies the result to the DDC group 8. In this way, the auxiliary power supply circuit 9 is in an ON state.

In order to quickly perform the switching of the power to the auxiliary power supply and starting of the PLP processing, a function of monitoring the power-off is added to the functions of the power supply device 5. As illustrated in FIG. 2, the power supply device 5 further includes a low voltage monitor circuit 52. The low voltage monitor circuit 52 is arranged between the protection circuit 6 and the auxiliary power supply circuit 9. The low voltage monitor circuit 52 is electrically inserted between the line L2 and the auxiliary power supply circuit 9. The line L2 electrically connects the protection circuit 6 and the power supply circuit 51. The low voltage monitor circuit 52 includes a monitor terminal MR and an output terminal OUT. In the low voltage monitor circuit 52, the monitor terminal MR is connected to the line L2, and the output terminal OUT is respectively connected to the enable terminal EN of the DDC 92 in the auxiliary power supply circuit 9 via a control output terminal PD and the controller 4 via the control output terminal PD. The low voltage monitor circuit 52 monitors whether or not the electric potential at the line L2 is lower than a threshold value Vbu.

Figure 5:
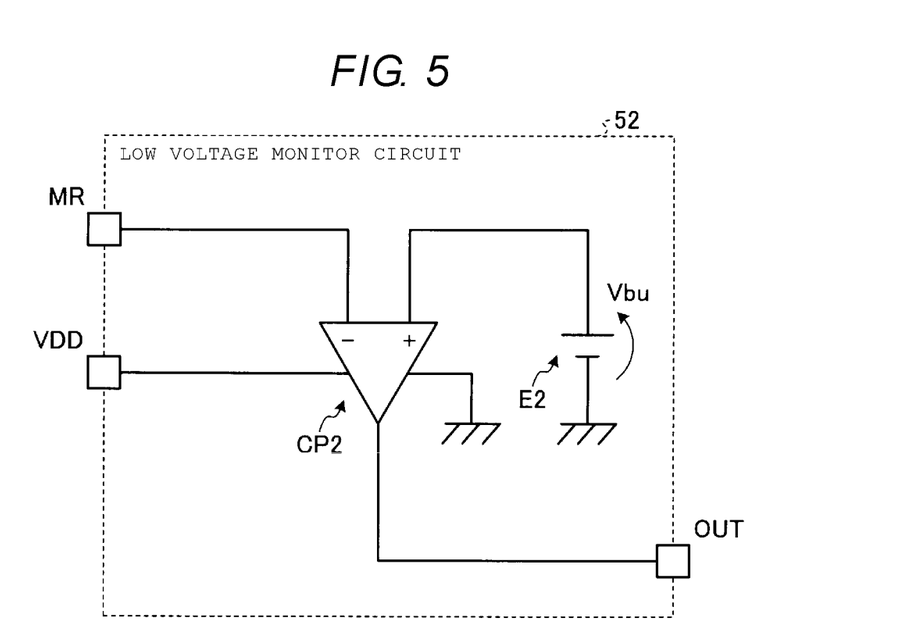
FIG. 5 is a circuit diagram illustrating a configuration of a low voltage monitor circuit in the embodiment.

Specifically, the low voltage monitor circuit 52 is configured as illustrated in FIG. 5. FIG. 5 is a circuit diagram illustrating a configuration of the low voltage monitor circuit 52. The configuration illustrated in FIG. 5 is one example, and another configuration can be used as long as the circuit monitors whether or not the electric potential at the line L2 is lower than a threshold value Vbu.

The low voltage monitor circuit 52 includes a power terminal VDD, a monitor terminal MR, an output terminal OUT, a comparator CP2, and a voltage source E2. In the comparator CP2, the power supply node is electrically connected to the power terminal VDD, a ground node is electrically connected to the ground electric potential, an inverting input terminal is electrically connected to the monitor terminal MR, a non-inverting input terminal is electrically connected to the voltage source E2, and an output node is electrically connected to the output terminal OUT. The voltage source E2 generates the threshold value Vbu as a reference voltage and supplies the reference voltage to the comparator CP2. The reference voltage is a voltage which is equal to the threshold voltage to be monitored by the low voltage monitor circuit 52 and has a level between the electric potential of the power supply voltage VDD and the ground level. The reference voltage (the threshold value Vbu) is set to a value lower than the reference voltage (the threshold voltage Vov) (refer to FIG. 3) in the high voltage monitor circuit 7.

If the electric potential at the monitor terminal MR is higher than the threshold value Vbu, the comparator CP2 supplies a signal of L level to the output terminal OUT as a comparison result. When the electric potential at the monitor terminal MR becomes lower than the threshold value Vbu, the comparator CP2 supplies a signal of H level to the output terminal OUT as a comparison result.

For example, as illustrated in FIG. 4, the low voltage monitor circuit 52 monitors whether or not the electric potential at the line L2 is lower than the threshold value Vbu. The threshold value Vbu is a value lower than the threshold voltage Vov in the high voltage monitor circuit 7. That is, the threshold value Vbu is a value lower than the voltage level at the line L2 (for example, substantially close to 12V), and is a value indicating that the power-off occurs. The threshold value Vbu is, for example, 8.5V.

In a period before timing t2, the low voltage monitor circuit 52 outputs the L level to the output terminal OUT according to the fact that the electric potential at the line L2 is higher than the threshold value Vbu. The L level can also be regarded as a monitoring result indicating that the electric potential at the line L2 is higher than the threshold value Vbu. That is, the low voltage monitor circuit 52 makes the enable terminal EN of the DDC 92 in the auxiliary power supply circuit 9 be at the L level. In this way, during the period in which the electric potential at the line L2 is higher than the threshold value Vbu, the auxiliary power supply circuit 9 is maintained to be in OFF state.

At the timing t2, the low voltage monitor circuit 52 outputs the H level from the output terminal OUT according to the fact that the electric potential at the line L2 is lower than the threshold value Vbu.

The H level can also be regarded as a monitoring result indicating that the electric potential at the line L2 is lower than the threshold value Vbu. That is, the low voltage monitor circuit 52 makes the enable terminal EN of the DDC 92 in the auxiliary power supply circuit 9 be at the H level, and supplies the H level to the controller 4 as a notification of the power-off.

The auxiliary power supply circuit 9 is in an ON state, and the power is switched to the auxiliary power supply from the main power supply. That is, according to the fact that the supply of the main power supply from the power supply circuit 51 to the DDC group 8 is disconnected), the DDC 92 in the auxiliary power supply circuit 9 is in an ON state at the timing t2, and is maintained to be in ON state thereafter, and thus, the auxiliary power supply is continuously supplied to the DDC group 8 from the auxiliary power supply circuit 9. Along with that, the controller 4 receives the notification of the power-off, and starts the PLP processing using the auxiliary power supply.

For example, as the PLP processing, the controller 4 writes dirty data in a write buffer in the volatile memory group 3 into an emergency transfer block in the nonvolatile memory group 11 such that the data becomes nonvolatile. The emergency transfer block is dedicated block used for the PLP processing performed while the power-off occurs. In addition, as the PLP processing, the controller 4 writes administration information (e.g., logical-physical address conversion table, or the like) in the cache area in the volatile memory group 3 into the emergency transfer block in the nonvolatile memory group 11 such that the information becomes nonvolatile. Furthermore, as the PLP processing, the controller 4 logically disconnects the link (such as communication connection) to the host device HA (that is, stops the communication with the host device HA due to the abnormal power supply). As part of the PLP processing, the controller 4 may cancel the in-processed write command/read command that are not acknowledged as being completed to the host device HA.

At a timing t3, the high voltage monitor circuit 7 outputs the L level to the output terminal OUT according to the fact that the electric potential at the line L1 is lower than the threshold voltage Vov. That is, the high voltage monitor circuit 7 makes the enable terminal EN of the protection circuit 6 be at the L level. In this way, the protection circuit 6 is changed to be in an ON state according to the fact that the electric potential at the line L1 is lower than the threshold voltage Vov.

The electric potential at the line L2 gradually increases after the timing t3 according to the fact that the protection circuit 6 is in the ON state.

At a timing t4, the low voltage monitor circuit 52 outputs the L level to the output terminal OUT according to the fact that the electric potential at the line L2 is higher than the threshold value Vbu. That is, the low voltage monitor circuit 52 makes the enable terminal EN of the DDC 92 in the auxiliary power supply circuit 9 be at the L level and supplies the L level to the controller 4 as a notification of releasing the power-off.

In this way, the auxiliary power supply circuit 9 is in an OFF state and the power is switched to the main power supply from the auxiliary power supply. That is, the DDC 92 in the auxiliary power supply circuit 9 is in an OFF state, and auxiliary power supply circuit 9 is maintained to be in the OFF state after the timing t4. That is, the state is returned to the state in which the power supply voltage is supplied to the power supply device 5 from the power pins of the host interface 2 via the line L1 and the protection circuit 6, and then the main power supply is supplied from the power supply device 5 to the DDC group 8. Along with that, the controller 4 receives the notification of releasing the power-off, and rewrites the data retracted to the emergency transfer block into the volatile memory group 3 using the PLP processing, and restores the data.

As described above, the memory system 1 in the exemplary embodiment monitors the level of the power supply voltage input to the protection circuit 6, and makes the protection circuit 6 be in an OFF state in a case where the monitored level of the power supply voltage is lower than the clamp voltage of the protection circuit 6 and is close to the allowable upper limit voltage of the power supply circuit 51. In this way, it is possible to prevent the power supply circuit 51 from being destroyed due to the overvoltage.

Specifically, the memory system 1 in the exemplary embodiment includes a high voltage monitor circuit 7. In a case where the electric potential at the line L1 connecting the host interface 2 and the protection circuit 6 exceeds the threshold voltage Vov, the high voltage monitor circuit 7 supplies a signal indicating that the electric potential exceeds the threshold voltage Vov to the enable terminal EN of the protection circuit 6. The threshold voltage Vov is a value lower than the allowable upper limit voltage (for example, 14V) of the power supply circuit 51, higher than the normal electric potential level (for example, substantially, close to 12V) at the line L1, and is close to the allowable upper limit voltage of power supply circuit 51. In this way, in a case where the electric potential is close to the allowable upper limit voltage of the power supply circuit 51 even if it is lower than the clamp voltage of the power supply circuit 51, it is possible to make the protection circuit 6 be in the OFF state.

If an inverter is electrically inserted between the output terminal OUT of the high voltage monitor circuit 7 and the enable terminal EN of the protection circuit 6, in the signal supplied to the enable terminal EN of the protection circuit 6 from the high voltage monitor circuit 7, a logic level indicating that the electric potential exceeds the threshold voltage Vov and a logic level making the protection circuit 6 be in the OFF state may be inverted. For example, the high voltage monitor circuit 7 may be configured so as to output the H level when the electric potential at the line L1 is equal to or lower than the threshold voltage Vov, and output the L level when the electric potential at the line L1 exceeds the threshold voltage Vov. That is, when the electric potential at the line L1 exceeds the threshold voltage Vov, the signal at the L level from the high voltage monitor circuit 7 indicating that the electric potential exceeds the threshold voltage Vov is logically inverted by the inverter and converted to a signal at the H level, making the protection circuit 6 be in the OFF state, and then, the resulting signal is supplied to the enable terminal EN of the protection circuit 6.

Alternatively, the low voltage monitor circuit 52 may be provided on the outside of the power supply device 5 as long as the low voltage monitor circuit 52 monitors whether or not the electric potential at the line L2 lower than the threshold value Vbu and supplies the monitoring result to the enable terminal EN of the DDC 92 and the controller 4.

Figure 6:
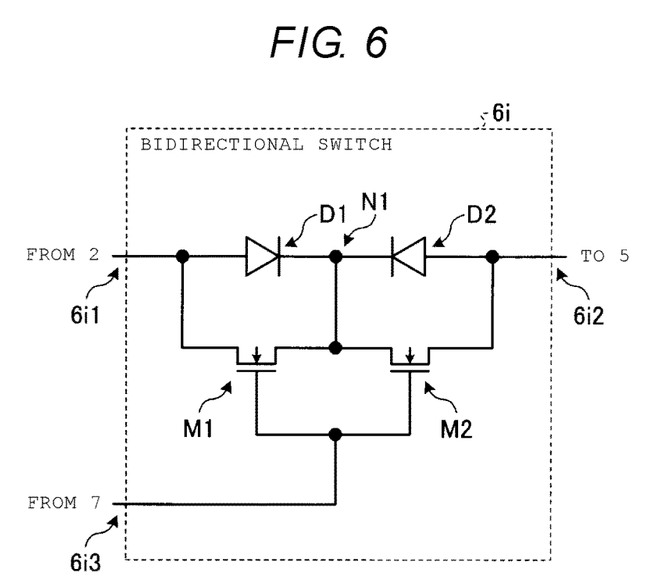
FIG. 6 is a circuit diagram illustrating a configuration of a protection circuit in a modification example of the embodiment.

Alternatively, the protection circuit 6 illustrated in FIG. 1 may be a bidirectional switch circuit 6i as illustrated in FIG. 6, performing the protection circuit operation, instead of the eFuse. FIG. 6 is a circuit diagram illustrating a configuration of the protection circuit 6i in a modification example of the exemplary embodiment. In the protection circuit 6i, the power pins of the host interface 2 are connected to an input node 6i1, the power supply device 5 is connected to an output node 6i2, and the high voltage monitor circuit 7 is connected to an enable node 6i3. The protection circuit 6i includes a diode D1, a diode D2, a transistor M1, and a transistor M2.

An anode of the diode D1 is connected to the input node 6i1 and a cathode is connected to a common connection node N1. An anode of the diode D2 is connected to the output node 6i2 and a cathode is connected to the common connection node N1. A gate of the transistor M1 is connected to the enable node 6i3, a source is connected to the input node 6i1, and a drain is connected to the common connection node N1. A gate of the transistor M2 is connected to the enable node 6i3, a source is connected to the common connection node N1, and a drain is connected to the output node 6i2.

In this configuration also, in a case where the electric potential at the line L1 where the host interface 2 and the protection circuit 6 are connected to each other exceeds the threshold voltage Vov, it is possible to make the protection circuit 6i be in OFF state by the high voltage monitor circuit 7 supplying the H level to the enable terminal EN of the protection circuit 6.

Figure 7:
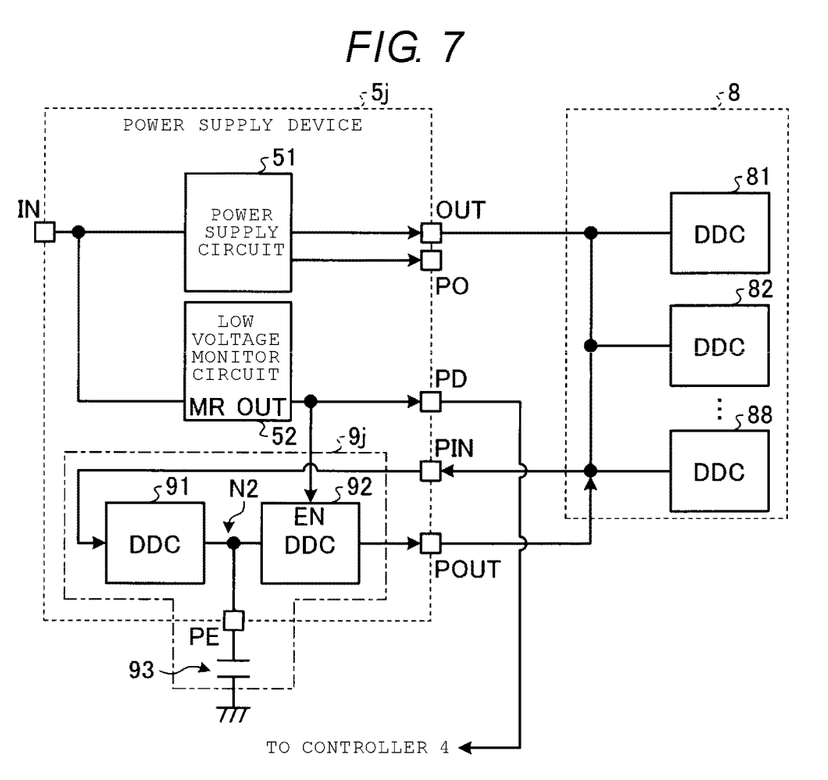
FIG. 7 is a diagram illustrating configurations of a power supply device and an auxiliary power supply circuit in another modification example of the embodiment.

Alternatively, as illustrated in FIG. 7, an auxiliary power supply circuit 9j may be partially incorporated in a power supply device 5j. FIG. 7 is a diagram illustrating a configuration of the power supply device 5j and the auxiliary power supply circuit 9j in another modification example of the exemplary embodiment.

For example, a DDC 91 and a DDC 92 in the auxiliary power supply circuit 9j are provided in the power supply device 5j, and a back-up battery 93 is externally connected to a node N2 between the DDC 91 and the DDC 92 via a terminal PE. The DDC 91 receives the power supply voltage Vdd output from the power supply circuit 51 via a terminal PIN, adjust the level of the power supply voltage Vdd to a level suitable for charging the back-up battery 93 (for example, step down or boost), and supplies the result to the back-up battery 93. A terminal OUT of the low voltage monitor circuit 52 is connected to a control output terminal PD and an enable terminal EN of the DDC 92. The DDC 92 is in an ON state when receiving an active level control signal at the enable terminal EN, adjust the voltage in accordance with an amount of electric charges charged in the back-up battery 93 to a level suitable for an operation of the DDC group 8 (for example, boost or step down), and supplies the result to the DDC group 8 via a terminal POUT.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a host interface;
   a nonvolatile memory;
   a power supply circuit that is arranged between the host interface and the nonvolatile memory, and supplies primary power to the nonvolatile memory;
   a protection circuit that is arranged between the host interface and the power supply circuit, and configured to clamp a power supply signal supplied through the host interface to the power supply circuit to a first voltage; and
   a first voltage monitor circuit that is arranged between the host interface and the protection circuit, and configured to monitor a voltage level of the power supply signal supplied through the host interface and to cause the voltage level of the power supply signal supplied to the power supply circuit to be decreased from the first voltage to a second voltage when the monitored voltage level is below a first threshold voltage.

2. The memory system according to claim 1, further comprising:
   an auxiliary power supply circuit; and
   a second voltage monitor circuit that is arranged between the protection circuit and the auxiliary power supply circuit, and configured to monitor a voltage level supplied to the power supply circuit.

3. The memory system according to claim 2, wherein when the power supply signal supplied to the power supply circuit is decreased to the second voltage, the auxiliary power supply circuit is turned ON so as to supply auxiliary power to the nonvolatile memory.

4. The memory system according to claim 3, further comprising:
   a first line that electrically connects the host interface and the protection circuit to each other,
   wherein the first voltage monitor circuit is configured to monitor a voltage level of the first line.

5. The memory system according to claim 4, further comprising:
   a second line that electrically connects the protection circuit and the power supply circuit to each other,
   wherein the second voltage monitor circuit is configured to monitor a voltage level of the second line.

6. The memory system according to claim 2, further comprising:
   a first line that electrically connects the host interface and the protection circuit to each other, wherein the first voltage monitor circuit is configured to cause a first control terminal of the protection circuit to be at a first voltage level in a case where a voltage level of the first line is lower than the first threshold voltage, and to cause the first control terminal to be at a second voltage level in a case where the voltage level of the first line is higher than the first threshold voltage, and wherein the protection circuit electrically connects and disconnects the host interface and the power supply circuit according to the voltage level at the first control terminal.

7. The memory system according to claim 6, further comprising:

a second line that electrically connects the protection circuit and the power supply circuit to each other, wherein the second voltage monitor circuit is configured to cause a second control terminal of the auxiliary power supply circuit to be at a third voltage level in a case where a voltage level at the second line is lower than a second threshold voltage, and to cause the second control terminal to be at a fourth voltage level in a case where the voltage level at the second line is higher than the second threshold voltage, and wherein the auxiliary power supply circuit is in an ON state or an OFF state according to the voltage level at the second control terminal.

8. The memory system according to claim 7, wherein the first threshold voltage is lower than the first voltage.

9. The memory system according to claim 7, wherein the first voltage is higher than an allowable upper limit voltage of the power supply circuit.

10. The memory system according to claim 9, wherein the first threshold voltage is lower than the allowable upper limit voltage of the power supply circuit.

11. The memory system according to claim 2, wherein the protection circuit includes a control terminal electrically connected to an output of the first voltage monitor circuit, and the protection circuit decreases the voltage level of the power supply signal supplied to the power supply circuit to the second voltage if a voltage level at the control terminal is not at an active level.

12. The memory system according to claim 11, wherein the first voltage monitor circuit includes:

a first input terminal connected to a first line that electrically connects the host interface and the protection circuit to each other, a first output terminal connected to the control terminal of the protection circuit, a first voltage source supplying a voltage corresponding to the first threshold voltage, and a first comparator having a first input node connected to the first input terminal, a second input node connected to the first voltage source, and a first output node connected to the first output terminal.

13. The memory system according to claim 12, wherein the second voltage monitor circuit includes:

a second input terminal connected to a second line that electrically connects the protection circuit and the power supply circuit to each other, a second output terminal connected to a control terminal of the auxiliary power supply circuit, a second voltage source, and a second comparator that includes a third input node connected to the second input terminal, a fourth input node connected to the second voltage source, and a second output node connected to the second output terminal.

14. A method of controlling power supplied to a power supply circuit provided in a memory system, comprising:

monitoring a voltage level of a power supply signal that is to be clamped to a first voltage level before being supplied to the power supply circuit;

if the voltage level is less than a first threshold voltage that is less than the first voltage level, supplying the power supply signal to the power supply circuit for powering a memory portion of the memory system; and if the voltage level is greater than the first threshold voltage, disconnecting the power supply signal supplied to the power supply circuit and supplying auxiliary power to the memory portion of the memory system.

15. The method according to claim 14, wherein the memory system includes a protection circuit between a host interface through which the power supply signal is received and the power supply circuit, the protection circuit being configured to clamp the power supply signal to the first voltage.

16. The method according to claim 15, wherein a first line is electrically connected between the host interface and the protection circuit, and the voltage level of the power supply signal that is to be clamped is monitored by monitoring a voltage level of the first line.

17. The method according to claim 16, wherein a second line is electrically connected between the protection circuit and the power supply circuit, the method further comprising:

monitoring a voltage level of the second line; and supplying the auxiliary power to the power supply circuit if the voltage level of the second line is less than a second threshold voltage, wherein the protection circuit causes the voltage level of the second line to be less than the second threshold voltage when the voltage level of the first line is greater than the first threshold voltage.

18. The method according to claim 17, wherein the first voltage is higher than an allowable upper limit voltage of the power supply circuit.

19. The method according to claim 18, wherein the first threshold voltage is lower than the allowable upper limit voltage of the power supply circuit.

20. The method according to claim 15, wherein the protection circuit electrically connects and disconnects the host interface and the power supply circuit according to the monitored voltage level.

* * * * *